Nov. 13, 1962     J. HOURDIAUX     3,063,611
MOTION PICTURE APPARATUS Filed Oct. 24, 1957     6 Sheets-Sheet 1

Fig.1.

Nov. 13, 1962  J. HOURDIAUX  3,063,611
MOTION PICTURE APPARATUS
Filed Oct. 24, 1957  6 Sheets-Sheet 3

Nov. 13, 1962　　J. HOURDIAUX　　3,063,611
MOTION PICTURE APPARATUS
Filed Oct. 24, 1957　　6 Sheets-Sheet 6

United States Patent Office 3,063,611
Patented Nov. 13, 1962

3,063,611
MOTION PICTURE APPARATUS
Jules Hourdiaux, 96 Ave. de Versailles, Paris, France
Filed Oct. 24, 1957, Ser. No. 692,102
Claims priority, application France Mar. 7, 1949
4 Claims. (Cl. 226—114)

The present invention relates to motion picture cameras or projectors and its chief object is to provide devices of this kind which are better adapted to meet the requirements of practice than those existing at the present time.

To achieve the above and other of its objectives, the invention contemplates the provision of film moving apparatus for moving a film along a determined path, the said apparatus comprising a frame with a gate and a guide wall as well as feed means for forming a loop of film of constant length. The feed means includes a feed drum having an axis perpendicular to the direction of travel of the film along the guide wall. The feed means and the guide wall are relatively positioned to enable an intermediate portion of the loop to be flattened and slide along the guide wall. In addition, guiding means are provided on the frame and are arranged to cooperate with the edges of the film. The guiding means include, according to the invention, a fixed planar member and a relatively movable member spaced from the fixed member to define therewith a guide space for the film. A flange is provided on the fixed member to constitute a lateral guide for the film and a cantilever member is provided on the frame supporting the movable member and constituting a second lateral guide for the film.

In addition to the aforestated construction the invention further contemplates the provision of a beater lever pivoted to the frame about an axis parallel to that of the drum and a cylindrical beater head carried by the lever with its axis parallel to the last mentioned axis. The beater head is positioned to engage a portion of the film loop on its way from the guide wall to the drum and a rotating member is journalled in the frame about an axis parallel to the first mentioned axis.

In addition, the invention contemplates the provision of means for rotating the last mentioned member in synchronism with the drum, there being means including a plurality of bosses carried by the member and arranged to strike the lever during the rotation of the member for imparting to the lever a succession of impulses, each capable of stretching the loop by action of the beater head on the same. The bosses are adapted to propel the lever a distance from the rotating member on each of the impulses and an abutment is provided mounted on the frame to intercept the lever so that the lever rebounds from the abutment on each of the impulses. The abutment is spaced from the path of travel of the beater heads so that the film can move without coming into contact with this abutment.

Figure 1:
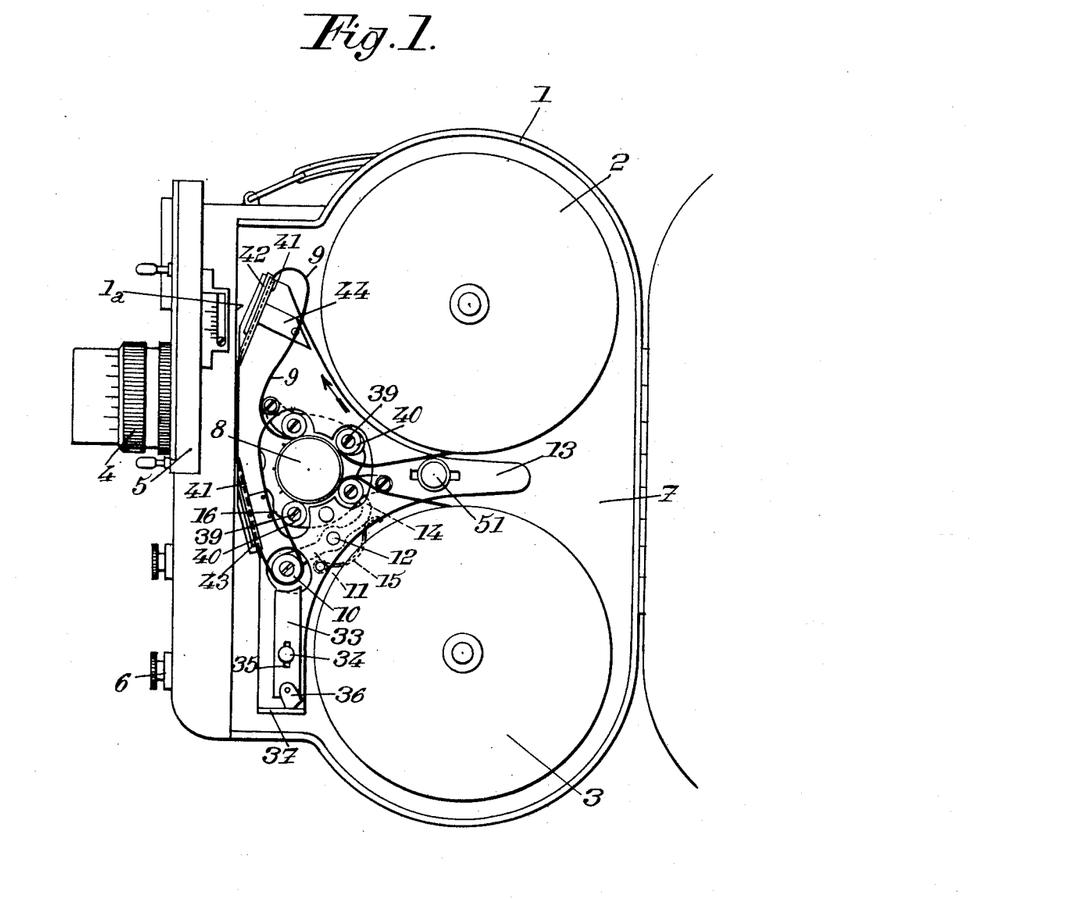
FIG. 1 shows, in side view (with the cover removed) a motion picture camera including a film feeding and guiding device made according to a first embodiment of my invention.

The example shown in FIG. 1 relates to a motion picture camera which essentially includes a frame or casing 1 in which are housed the supply film spool 2 and the take up film spool 3. This casing supports an adjustable lens device 4 and a rotary lens carrier 5 and also a control knob for starting the motor mechanism (not shown), which is for instance of the spring type. This mechanism drives a spindle which extends through a wall 7 of the casing and on which is removably keyed a feed drum 8 provided with sprocket pins adapted to engage holes provided in at least one of the edges or in the middle of film 9, in well known manner. This mechanism also drives the shutter adjacent to the lens.

The front portion of casing 1 is provided with a window or gate in line with the lens and which opens into the rear wall 1a of said front portion of casing 1.

Film 9, unwinding from spool 2 and which is fed frontward (toward the left of FIG. 1) by the upper portion of drum 8, forms a loop which, after following a path which will be hereinafter more fully described, ends on the under portion of drum 8, to pass therefrom to spool 3. Since both ends of said loop are driven in opposed directions by drum 8, the length of this loop is constant.

As is visible in FIG. 1, this loop formed by film 9 between its two passages on drum 8 would tend to expand toward the left to a greater distance than it actually does. But it is flattened due to the presence of the wall 1a of the casing, against which it is applied by its resiliency and along which it is caused to slide by a mechanism 8—10—11—16 which will be hereinafter described. This loop formed in the film is guided laterally through means 41—42—43 carried by a part 13 fixed to casing wall 7, as will be hereinafter described.

It should be noted that the movement of the portion of film 9 forming the above mentioned loop is not braked by being caused to pass between elements pressing it tightly from opposite sides as is the case with prior apparatus of the same kind. In particular, the front face of piece 7, located behind the lens gate opening into wall 1a is located at a sufficient distance behind said wall 1a to permit a free passage of film 101 so that said film is applied against wall 1a only by the resiliency of the loop formed by said film.

Film 9 is driven by a feed mechanism of the beater arm type including, in cooperation with drum 8, a roller 10 engaging the lower part of the loop formed in film 9, this roller being carried by a beater lever 11 oscillating about a pivot 12 fixed on a part 13 carried by casing wall 7. The end or nose 14 of lever 11 (which is urged upwardly by a spring 15) cooperates with bosses 16 uniformly distributed along the periphery of an annular piece 17 which turns together with feed drum 8. The number of these bosses 16 corresponds to the number of film frames which are to be passed for a full revolution of piece 17.

This feed device is to a degree analogous to conventional beater arm mechanism, but differs essentially therefrom for the following reasons:

In the conventional beater arm mechanism, the beater arm (corresponding to rocking lever 11) carries a nose or roller (corresponding to nose 14) which cooperates with a cam, including one or more bosses carried by a rotary member (such as annular piece 17). This nose or roller is constantly applied, by a sufficiently strong spring, against the cam outline so that the oscillation of the beater arm is positively controlled by the cam.

In my device, the periphery of member 17 does not constitue a cam, because nose 14 does not constantly follow the outline thereof (spring 15 being just sufficient to urge the beater arm upwardly, without being able to keep its nose 14 applied against said outline). Only the bosses 16 of member 17 cooperate with nose 14, thus imparting successive downward impulses to lever 11, the nose 14 of which is periodically driven out of contact with member 17. The downward movements of lever 11 are limited by its end coming into contact with an adjustable abutment 33 carried by casing 1 and against which said lever rebounds.

Thus, according to my invention, the rocking movement of the beater arm instead of being positively controlled, has a relative freedom which, in combination with the fact that the loop formed in film 101 is not strongly braked, ensures a smooth operation of the apparatus.

It should also be noted that the fact that spring 15 (when used) is not made strong enough to keep the nose 14 of the beater lever 11 constantly applied against the outline of annular member 17 permits of considerably reducing the power necessary to drive said member, which power, in conventional beater arm mechanisms, becomes prohibitive for high speeds of operation of the apparatus.

Abutment plate 33, fixed to support 13 by screws 34, extending through elongated holes or slots provided in said plate 33, bears, through a cam 36 of adjustable direction and which may be secured in any desired position, against a flange 37 of this support. Thus I obtain that the end of the active stroke of roller 10, in the course of which it causes the film to move forward a distance corresponding for instance to one half of a frame, is sharply determined and is uninfluenced by irregularities of shape and by wear and tear of annular member 17, since the movement of the beater lever, under the thrust of its spring 15, is stopped by its contact with abutment 33.

The operation of the lens shutter takes place in synchronism with the intermittent feed movement of the film so that the lens is covered by the shutter during this feed movement.

In the example shown in FIGS. 1 to 4, this shutter is controlled independently of the feed of the film by the mechanism housed in chamber 1a.

Figures 2, 3, 4, 5, 6, 7:
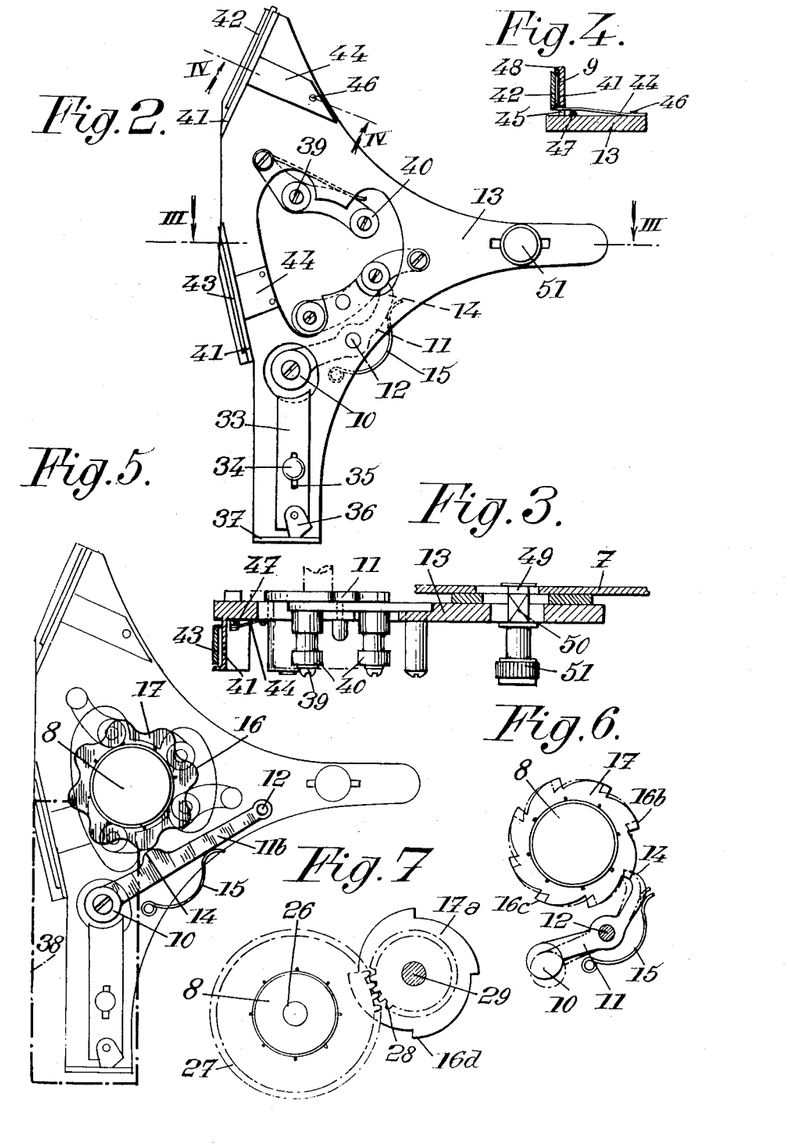
FIGS. 2, 3 and 4 show respectively in elevation, in horizontal section on line III—III of FIG. 2 and in section on line IV—IV of FIG. 2, a portion of this device.
FIGS. 5, 6 and 7 show, in diagrammatic elevation, three different modifications of the film feeding means.

In the modification of FIG. 5, the beater lever 11b is differently arranged, its pivot 12 being at the end thereof opposed to its end 10a which cooperates with the film loop, and its nose 14 being located between said ends of the lever. In this case, spring 15 may be dispensed with, the downward movements of the beater lever being produced by the impulses transmitted by bosses 16 to nose 14 and the upward movements being produced by the rebounding of the lever end on abutment 33.

Figures 8, 9, 10, 11, 12:
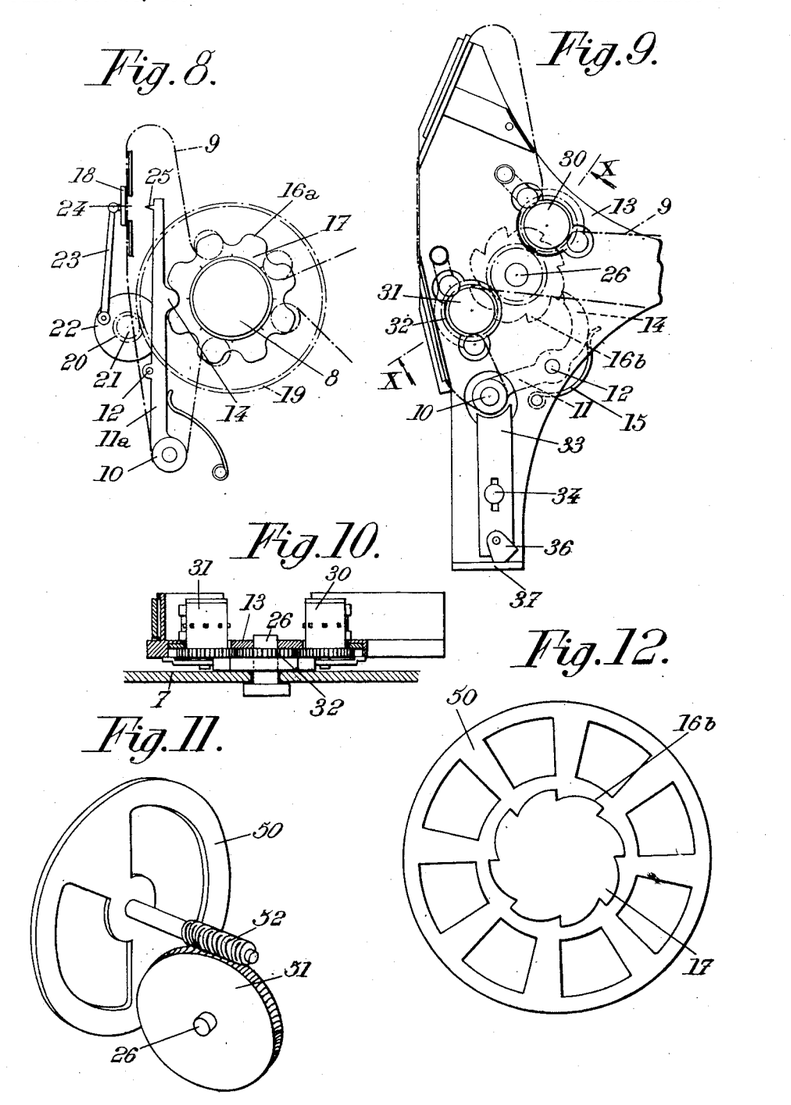
FIG. 8 shows, in elevation, a portion of a film feeding and guiding device made according to a further embodiment of my invention.
FIGS. 9 and 10 show, respectively in elevation and in section on line X—X of FIG. 9, another device of this kind.
FIG. 11 shows, in perspective, means for indirectly driving, through the device according to my invention, the shutter of a projector.
FIG. 12 shows, in elevation, means for directly driving, through the device according to my invention, the shutter of a projector.

In the example shown in FIG. 8, shutter 18 is directly controlled by the film driving device by providing on feed device 8, in addition to annular piece 17, a toothed wheel 19 which meshes with a pinion 20 the spindle 21 of which carries a crank or eccentric disc 22 which drives shutter 18 through a link 23, with a reciprocating movement in the vertical direction in front of the objective window 24. In this example, lever 11a, which carries roller 10, is directed upwardly and extends beyond nose 14, its free end carrying a projection 25 which engages one of the sprocket holes of the film in order to stabilize the picture when the film is stopped.

FIGS. 1 to 8 show that the bosses which control oscillating lever 11, 11a or 11b may be given different forms. In FIGS. 1 and 5, bosses 16 have a semi-circular or rounded shape. In FIG. 8, bosses 16a have a similar shape but their top portion is flattened. In FIGS. 6 and 7, the bosses are in the form of ratchet wheel elements either with inclined faces 16b (FIG. 6) including a circular rest portion 16c or with inclined faces 16d (FIG. 7) that rise constantly.

As shown by FIG. 7, instead of mounting annular piece 17 in such manner as to have its axis in coincidence with that of the driving spindle 26 of feed device 8, I may also place the annular piece at 17a at a distance from this axis and provide, between spindle 26 and the spindle 29 of annular piece 17a, a suitable transmission, for instance by mounting on spindle 26 a toothed wheel 27 in mesh with a pinion 28 fixed on spindle 29.

In other cases, as shown in FIGS. 9 and 10, feed drum 8, mounted on the same main drive spindle 26 as annular piece 17b, may have a diameter such that it is difficult to have the film passing in contact with this drum at two points of its periphery remote from each other (as in FIGS. 1 to 8). In this case I may make use of two auxiliary drums 30 and 31, provided on either side of drum 8. A driving connection, for instance through gears 32, is provided between these respective reels so that they are driven in synchronism from the main shaft 26.

In order to obtain a suitable angular adjustment of annular piece 17 or 17a with respect to feed drum 8 and to the nose 14 of oscillating lever 11 or 11a, I make use of a removable accessory constituted in the form of a marking member or gauge 38 (shown in dotted lines in FIG. 5). This accessory may be constituted by a sheet of metal, Celluloid, cardboard or any other material, having, for instance, a rectangular shape and the dimensions of which are such that it can bear, through two of its edges, upon fixed parts constituted in particular by the edges of one of the corners of casing 1. The corner of gauge 38 opposed to this angle is cut away in accordance with the shape of the bosses 16, 16a or 16b of the annular piece so that this piece can easily be turned in the suitable direction. After it has been used, gauge 38 is removed, which releases said piece.

On the support I mount, at suitable points, spindles 39 at right angles to support 13 on the side where film 101 passes and which carry, freely rotatable thereon, rollers 40 for applying this film against feed drum 8 (FIGS. 1 to 8) or against auxiliary drums 30 and 31 (FIGS. 9 and 10). These guiding rollers can, as known, be moved away from the adjacent drum by tilting, pivoting or sliding, to make it possible either to insert or to remove the film.

Film 9, supplied by film supply spool 2, passes around a portion of feed device 8 and then moves along a guide passage mounted on support 13 and which extends in front of the window 24 of lens 4. At the outlet of this guide passage, the film passes around roller 10 and then over another portion of feed device 8 before being wound on spool 3.

This guide passage, as shown in FIG. 4, includes a plate 41, either curvilinear or rectilinear, fixed on support 13 and extending over the whole length of the guide passage. At the inlet and the outlet thereof are provided two movable plates 42 and 43, shorter and held parallel to plate 41, at a slight distance therefrom so as to form the passage for film 9. Each plate 42 or 43 is supported by a strip 44 placed transversely with respect to fixed plate 40 and passing through an aperture 45 provided in the edge thereof close to the support. This strip is fixed through one end 46 thereof to support 13 and through its other end to the inner edge of movable plate 42 or 43. The natural elasticity of strip 44, or an auxiliary spring 47, tends to move plate 42 (or 43) parallel to fixed plate 40 until it comes in abutting contact with a lateral flange 48 of fixed plate 41. The width of aperture 45 is sufficient to make it possible, by pushing back strip 44 until it is applied against support 13, to insert the film easily into the space existing between the flange 48 of fixed plate 41 and the external edge of movable plate 42 or 43, by slightly curving the film to introduce it into the passage. When strip 44 is released, it moves automatically away from support 13 and pushes plate 42 or 43 against flange 48 while holding the adjacent edge of film 101, as visible in FIG. 4. As is further clear from FIG. 4, the passage has a first dimension, between plates 41 and 42 (or 43), which is greater than the thickness of the film while there is a second dimension, between flange 48 and strips 44, which is at least equal to the width of the film. As a consequence thereof, the film can pass freely through each passage.

The support may be fixed, in a removable manner, on partition 7 by means of a knob 49 (FIG. 3) carried by the inner end of a rod 50 engaged in a slot provided in wall 7, the other threaded end of rod 50 being engaged in the threaded hole of a milled knob 51 which, when fully engaged, bears upon the external face of support 13 to secure it on wall 7.

I thus obtain a system, constituted by feed drum 8, film guiding rollers 40, driving roller 10 with its control means and passage 41—43 for the guiding of the film, which is mounted on a support 13 fixed in a removable manner on a wall 7 of the apparatus. The locations and operation of all the elements of this system depend upon the dimensions of the film and upon the size of the picture and it therefore suffices to replace this system by another one, made on the same principle but adapted to a film or pictures of different dimensions to make it possible to use the same apparatus for such a film.

In what precedes I have considered the case of a camera apparatus but an analogous arrangement can be used, with the same effects and advantages, for projection apparatus. It is known that these apparatus include a rotary shutter which cooperates with the projection window in well known manner. This shutter 50 can be operated in synchronism with the unwinding of the film, as shown by FIGS. 11 and 12, by the main driving spindle 26, either indirectly through a helical wheel 51 and a worm gear 52 (FIG. 11) (in the case of direct illumination), or directly by making the shutter rigid with annular piece 17 with its bosses such as 16b (FIG. 12) (in the case of indirect illumination).

Figure 13:
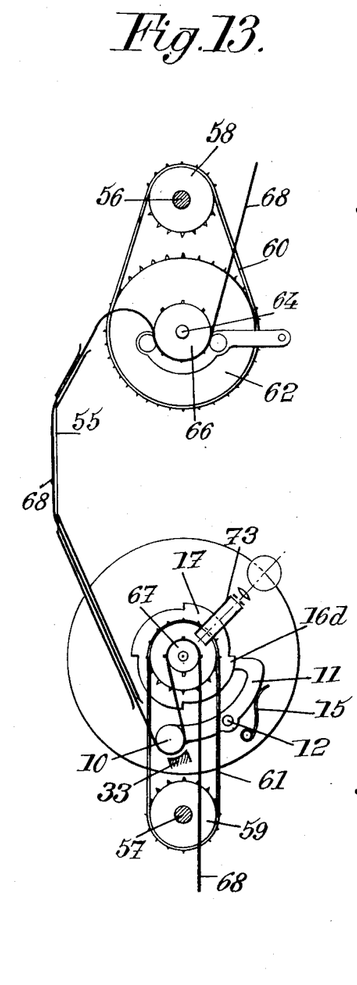
FIGS. 13 and 14 show respectively in side view and in elevation (with parts in section and parts cut away), a driving device made according to another embodiment of my invention and more especially adapted for use with a projector.
Figure 14:
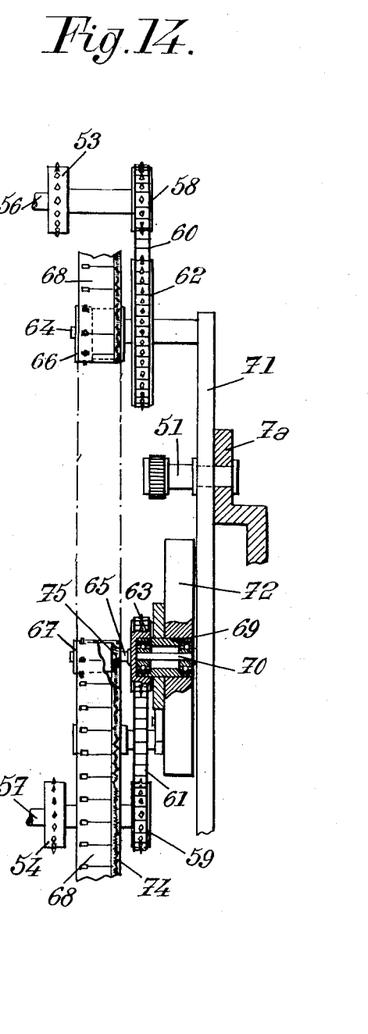

The device such as described permits of transforming, as shown in FIGS. 13 and 14, a projection apparatus (or a camera) built for a given film size, for instance 35 mm., the unwinding of the film being obtained by means of two feed drums 53 and 54, so that it can be used for the drive of a film of different size, for instance 16 mm. or 9.5 mm. The use of two feed drums such as drums 53 and 54, provided respectively at the inlet and the outlet of guiding passage 55, is more particularly suitable in the case of big apparatus for standard films (of 35 mm. size).

In this case, the spindles 56 and 57 of these feed drums are driven from a common source (motor, spring, hand crank), not shown, so that they run in synchronism and in a continuous manner.

In order to be able to make this transformation without modifying portions of the apparatus other than those necessary for driving and guiding the film, I fix on each of the spindles of drums 53 and 54 a pinion 58 or 59 which drives, through a chain 60 or 61, a pinion 62 or 63 the spindle 64 or 65 of which carries a feed drum 66 or 67 which serves to drive a film 68 of a size different from that corresponding to drums 53 and 54. Each spindle 64 or 65 is freely engaged, by means of a sleeve 69 with ball or roller bearings, on a rod 70 fixed on a support plate 71 adapted to be fixed in a removable manner on a fixed support 72 of the apparatus by means of at least one screw with a knob 51 or the like. The sleeve 69 of spindle 65 may be fitted with a fly-wheel 72 for making more uniform the movement of feed drum 67. It also carries an annular piece 17 provided with bosses analogous, for instance, to the bosses 16d of FIG. 7 and with which cooperates the oscillating lever 11 which carries the roller 10 serving to insure the intermittent drive of the film upon every change of picture, as above explained.

A sound track scanner 73, diagrammatically shown in FIG. 13, may be mounted on a fixed support opposite the sound track 74 of the film, when such a track exists, and the light beam which passes through this scanner may be received and reflected toward this track through a silvered annular part 75, or any other reflecting device, mounted on the end close to drum 67, the transverse section of this annular part having a suitable concave curvature. This arrangement makes it possible advantageously to replace the mirrors or prisms which, otherwise, would be necessary for reflecting the image of the sound record toward the sound track scanner 73.

In the example shown in FIGS. 13 and 14, the apparatus was initially built for projecting standard 35 mm. films and feed drums 53 and 54 were devised for passing four pictures per revolution. It is known that Maltese cross mechanisms or the like operate in this way. This apparatus was transformed, owing to the provision of the elements supported by plate 71, in such manner that 16 mm. films could be projected by means of the same apparatus, with feed drums 66 and 67. In these conditions, these drums 66 and 67 are given suitable dimensions, in particular concerning their length and their diameter and the chain transmissions 60 and 61 are arranged in such manner as to obtain the desired reduction of the motion of the existing driving spindles 56 and 57 so that feed devices 66 and 67 drive film 68 at the desired speed, that is to say four frames per revolution in accordance with the operation of the Maltese cross. Sprocket wheels 58 and 59, reserved for the driving of 16 mm. films, are carried by spindles 56 and 57 and not by plate 71. They must therefore be fixed on these spindles in a removable manner so as to make it possible to replace them by other ones, corresponding for instance to a 9.5 mm. film, when the apparatus is desired to be also adaptable for this purpose.

Referring now to FIGS. 15–22, film 101 which unwinds from the film supply spool is engaged on a sprocket drum 102 and forms a loop 103 in the usual way after it leaves this drum. The film then passes in front of projector device 104, where it is guided by means which will be hereinafter described in a detailed fashion. Before engaging on the sprocket drum 105, the film is subjected to the action of the intermittent feeding means. After leaving drum 105, the film passes in front of the sound reading device 106 and returns to drum 105 before going to the film take-up spool. The usual means are provided for keeping the film engaged on sprocket drums 102 and 105 and also there is provided the smooth roller 106a located opposite the sound reading apparatus 106. These means will not be described in detail.

The sprocket drums 102 and 105 are driven simultaneously and in a continuous fashion by a shaft 107 (FIG. 16) driven by, for instance, an electric motor. This shaft 107 carries a worm 108 which meshes with toothed wheels 109 and 110 keyed respectively on shafts 111 and 112 which drive drums 102 and 105 respectively.

Between these sprocket drums I provide the means for guiding the film when it is passing in front of the projection gate. These means include a plate 113 of flat or slightly curved shape located opposite the gate and provided with an aperture 114 (FIG. 20) for the passage of the light beam. The system further includes the usual framing mechanisms which are not shown since they have no direct bearing on the present invention. Plate 113 is carried by the apparatus frame, preferably through means, such as screws 115 and elongated slots 116, which permit adjusting it with respect to its support in the lateral direction.

The face of plate 113 which is in contact with film 101 carries at least one transverse elastic strip 117 (FIGS. 20 and 22) which extends across the film and bears thereon to keep it in position. The film is thus elastically applied against plate 113 and it suffices to move strip 117 away from the plate to be able to engage the film under said strip or to remove it therefrom. Lateral guiding of the film is insured by means of fingers 118 distributed at different levels along plate 113 and located on the same vertical line, every finger including a straight edge 119 intended to cooperate with the edge of the film so as to guide it. Fingers 118 also include a surface 120 which extends over the corresponding side portion of the film so as to prevent it from moving away from plate 113. When the film is set in position and after it has been engaged under elastic strips 117, it suffices to slide the edge portion of the film under the parts 120 of fingers 118.

Figure 16:
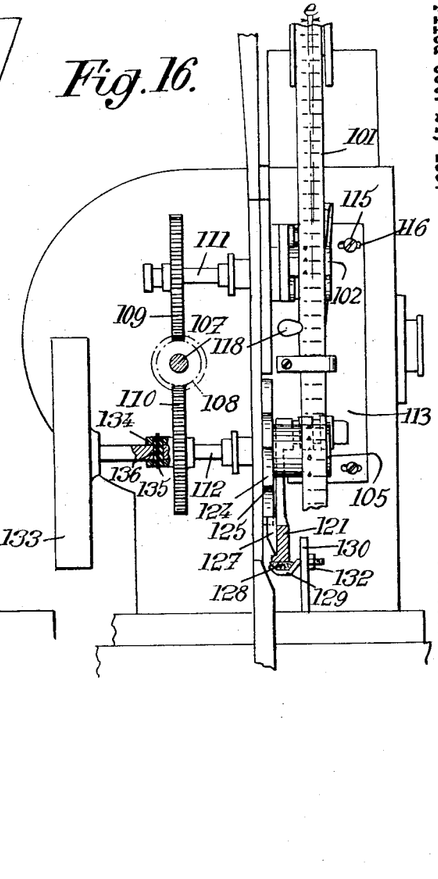

In order to make sure that the left hand edge of film 101 truly engages the edges 119 of fingers 118, plate 113 is displaced toward the right in FIG. 16 by a distance $e$. This displacement of plate 113 in the lateral direction is given by means of cooperating pin and slot means 115 and 116.

Figure 15:
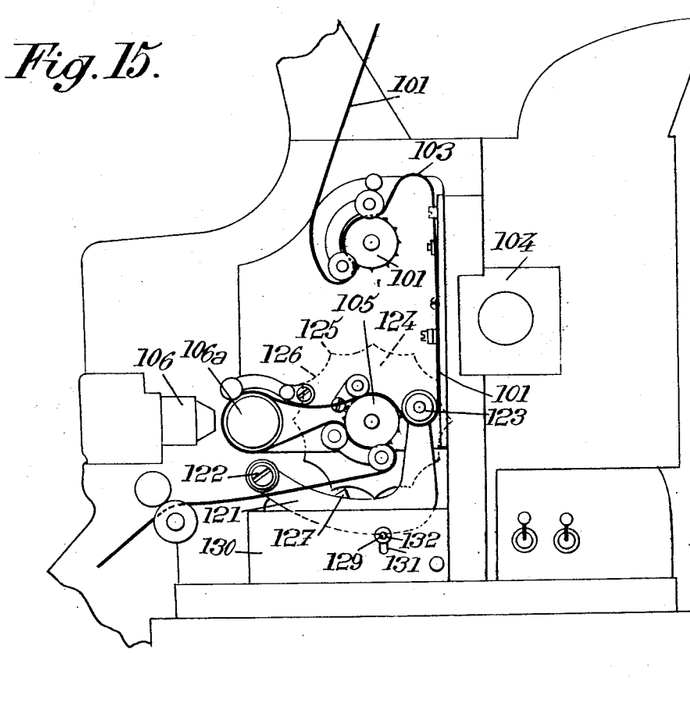
FIGS. 15 and 16 diagrammatically show respectively in side view and in elevational view (with parts in section and parts cut away), a motion picture projector made according to still another embodiment of my invention.

Film feed is obtained by means of beater arm 121 of bent shape pivoted freely about a horizontal fixed axis 122 carried by the frame of the machine. The free end of lever 121 carries a roller 123 which rests freely in a loop formed by the film as it reaches the bottom end of guiding plate 113 and before it passes around drum 105. This bent lever 121 is given a rocking movement in a vertical plane with an amplitude corresponding to the height of a picture or frame of the film. It follows that when this lever 121 moves downwardly it causes the film to move forward a distance equal to one frame, whereas the film is temporarily stopped in front of the projection gate while lever 121 is moving upwardly.

Lever 121 is driven by means of a disc 124 fixed on the shaft 112 of drum 105. Along the periphery of this disc are provided bosses 125 connected together by curvilinear lines 126. These bosses serve to transmit to lever 121 a succession of impulses which drive this lever downwardly so that it loses contact with the disc, as visible in FIG. 19.

The number of bosses 125 depends upon the size of the pictures of the film and the distance between these bosses is determined by the number of frames or pictures which are located on the portion of the film applied upon drum 105. For instance, if drum 105 carries eight or twelve frames or pictures, the number of bosses 125 of disc 124 is also eight or twelve. However, the number of bosses is not necessarily equal to the number of frames or pictures resting upon drum 105. For instance, the number of bosses might be equal to one half of the number of pictures, which would make it possible to project two different pictures in the place of one picture of a normal size. Bosses 125 act upon lever 121 through a triangular part 127, for instance of fiber or any other noise reducing substance, carried by the edge of lever 121 in the plane of disc 124.

Lever 121, when it is driven downwardly by a projection 125 of disc 124, causes, through its roller 123, the film 101 to move to form a loop the amplitude of which is limited by the fact that the lower edge of lever 121 comes into contact with an abutment 128 carried by the frame of the apparatus. Preferably, this abutment 128 is made of a resilient material such as felt or rubber so that lever 121, when it is driven downwardly against this abutment, can rebound toward disc 124 which, in the meantime, has turned through the action of the shaft 112 together with drum 105. Lever 121 thus comes into contact with the next projection 125 of disc 124 and it is again projected downwardly toward abutment 128 and so on. During every downward movement of lever 121, the film moves forward a distance equal to a frame or a portion of a frame and during every upward movement of lever 121 the film stops in front of the projector frame. Of course, the speed of the film, the size of drum 105 and the amplitude of the rotating movement of lever 121 are chosen so that the intermittent feed of the film takes place over the desired length which depends upon the height of the picture and consequently the size of the film. Preferably, abutment 128 is made adjustable with respect to the driving disc 124, for instance by mounting this abutment on a substantially horizontal finger 129 which is carried by a vertical support 130 by means of the threaded end of the finger which is housed in a vertical slot 131 of support 130. A nut 132 makes it possible to secure the abutment in the desired position.

In order to prevent part 127, carried by lever 121, from violently striking the concave portions of disc 124 after lever 121 has rebounded on abutment 128, I may provide a counter abutment 128a (FIG. 19) carried by the machine frame and cooperating with lever 121.

Figures 19, 20, 21:
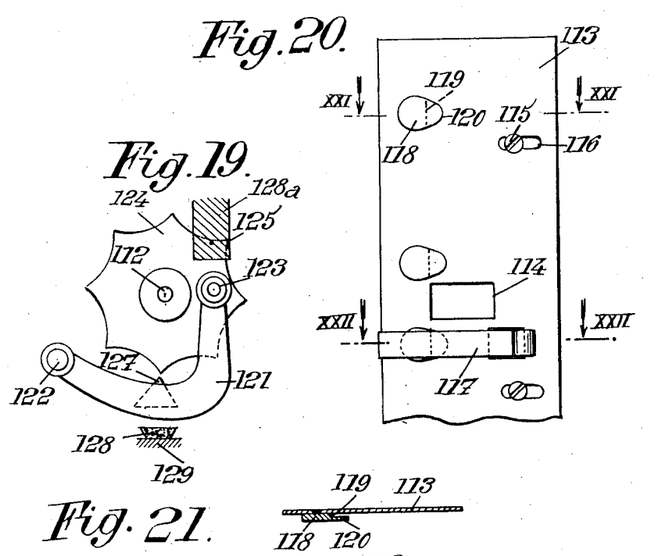
FIG. 19 is a side view of some portions of the apparatus of FIGS. 15 and 16 in another position in the course of its operation.
FIGS. 20, 21 and 22 show, on an enlarged scale and respectively in elevational view, in section on line XXI—XXI of FIG. 20, and in section on line XXII—XXII of FIG. 20, the guiding plate of the apparatus.
Figure 22:
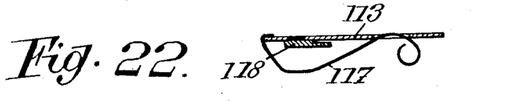

FIG. 19 shows lever 121 in an intermediate position in which it is in contact neither with disc 124 nor with abutment 128.

If the bosses 125 of the disc 124 are given alternately different values, lever 121 will also be given rocking displacements of alternately varying amplitudes, and this difference of amplitude may be used for obtaining an offsetting of the pictures with respect to one another, for instance for stereoscopic projections.

In order to stabilize the rotation movement of drum 105 and disc 124, both of which are mounted on the same shaft 112, this last mentioned shaft being driven by gears 108 and 110, I provide between wheel 110 and shaft 112 an elastic coupling such as shown by FIG. 16. For this purpose, the hub of gear wheel 110 carries a sleeve 134 and I provide in this sleeve and in shaft 112 registering holes into which is housed a rigid pin 135 surrounded by a tubular element 136 of an elastic material such as rubber. Shaft 112 may carry a fly-wheel 133 keyed thereon.

Figure 17:
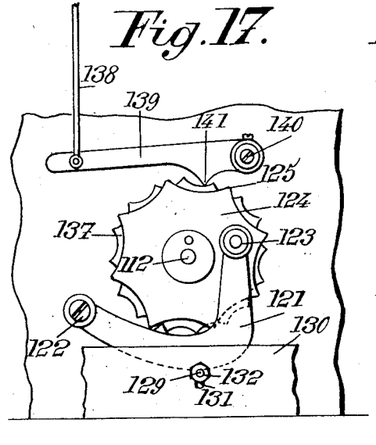
FIGS. 17 and 18 are similar views corresponding to an apparatus made according to still another embodiment.
Figure 18:
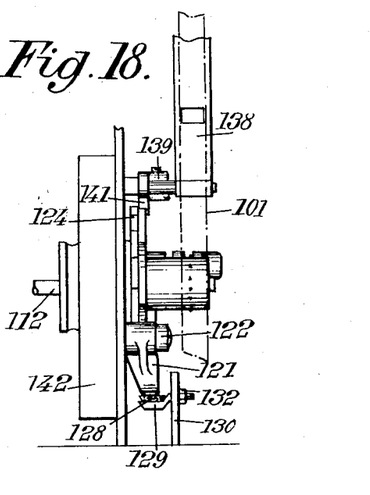

FIGS. 17 and 18 show a modification in which the feed of the film is obtained by means of a lever 121, a disc 124 and an elastic abutment 128 as above described but where there is added to disc 124 a toothed disc 137 also keyed on shaft 112 and intended to control the shutter of the projector or camera. This shutter (not shown) may be of any suitable type, and it is operated through a rod 138 hinged to the free end of a lever 139 pivoting about a fixed axis 140, this lever being provided with a nose 141 which cooperates with the edge of disc 137. In order to stabilize the movement of discs 124 and 137 and of drum 105, a fly-wheel 142 is mounted directly on shaft 112.

I might provide, to cooperate with the same disc 124 or a supplementary disc, a lever analogous to lever 121 but located in a position diametrally opposed to that of lever 121 in order to drive the film in the direction opposed to that of its normal feeding. The same disc, if of a sufficient diameter, might simultaneously control several levers, such as 121, to control the feed of several films, for instance in the case of panoramic pictures.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

This application is a continuation-in-part of my application Ser. No. 340,279, filed March 4, 1953, which was itself a continuation-in-part of my application Ser. No. 147,256, filed March 2, 1950. These two prior applications are now abandoned.

What I claim is:

1. Film moving apparatus for moving a film along a determinable path and comprising a frame, said frame including a gate and a guide wall operatively disposed with respect to said gate, feed means for forming a loop of film of constant length, said feed means including a feed drum having an axis perpendicular to the direction of travel of said film along said guide wall, said feed means and said guide wall being relatively positioned to enable an intermediate portion of said loop to be flattened against and slide along said guide wall, guiding means on said frame and arranged to cooperate with the edges of said film, said guiding means including a fixed planar member, a relatively movable member spaced from the fixed member to provide a guide space for said film, a flange on said fixed member to constitute a lateral guide for said film, and a cantilever member on said frame supporting said movable member and constituting a second lateral guide for said film, said fixed member being provided with an opening wherethrough extends said cantilever member, a beater lever pivoted to said frame about an axis parallel to that of said drum, a cylindrical beater head carried by said lever with its axis parallel to said last mentioned axis, said beater head being positioned to engage a portion of said film loop on its way from said guide wall to said drum, a rotating member journalled in said frame about an axis parallel to said first mentioned axis, means for rotating said last mentioned member in synchronism with said drum means, including a plurality of bosses carried by said member and arranged to strike said lever during the rotation of said member, for imparting to said lever a succession of pivoting impulses each capable of stretching said loop by action of said beater member on said loop, and an abutment mounted on said frame to cooperate with said lever to limit to a given value the amplitude of said impulses, said abutment being located at a distance from the path of travel of said beater head so that the film can move without coming into contact with said abutment.

2. Film moving apparatus for moving a film along a determinable path and comprising a frame, said frame including a gate and a guide wall operatively disposed with respect to said gate, feed means for forming a loop of film of constant length, said feed means including a feed drum having an axis perpendicular to the direction of travel of said film along said guide wall, said feed means and said guide wall being relatively positioned to enable an intermediate portion of said loop to be flattened against and slide along said guide wall, guiding means on said frame and arranged to cooperate with the edges of said film, said guiding means including a fixed planar member, a relatively movable member spaced from the fixed member to provide a guide space for said film, a flange on said fixed member to constitute a lateral guide for said film, and a cantilever member on said frame supporting said movable member and constituting a second lateral guide for said film, said fixed member being provided with an opening wherethrough extends said cantilever member, a beater lever pivoted to said frame about an axis parallel to that of said drum, a cylindrical beater head carried by said lever with its axis parallel to said last mentioned axis, said beater head being positioned to engage a portion of said film loop on its way from said guide wall to said drum, a rotating member coaxial with said drum and fixed therewith, a plurality of bosses on said member and arranged to strike said lever during the rotation of said member for imparting to said lever a succession of impulses directed away from said member and each capable of stretching said loop by action of said beater head on said loop, said bosses being adapted to propel said lever a distance from said rotating member on each of these impulses, and an abutment mounted on said frame to cooperate with said lever so that said lever rebounds from said abutment towards said rotating member on each of said impulses, said abutment being spaced from the path of travel of said beater head so that the film can move without coming into contact with said abutment.

3. A combination according to claim 2 further including a counter-abutment on said frame to limit the rebounding strokes of said beater lever toward said rotating member.

4. Film moving apparatus for moving a film along a predetermined path and comprising a frame, said frame including a gate and a guide wall operatively disposed with respect to said gate, feed means for forming a loop of film of constant length, said loop having inner and outer faces, said feed means and said guide wall being relatively positioned to enable an intermediate portion of said loop to be flattened against and slide along said guide wall, said feed means including a drum having an axis perpendicular to the direction of travel of said film along said guide wall, first and second film guiding means disposed on said frame along the path of travel of said film, the first guiding means upstream and the second guiding means downstream of said gate, each of said guiding means defining a passage for the film, said passages each having a cross-section with a first dimension accommodating the thickness of the film and a second dimension accommodating the width of the film, said first dimension being greater than the thickness of the film and the second dimension being at least equal to the width of the film so that the film is freely movable through the passages, a beater lever pivoted to said frame about an axis parallel to that of said drum, a cylindrical beater head carried by said lever and defining an axis parallel to said last mentioned axis, said beater head being adapted to engage the inner face of the portion of said film loop between said second guiding means and said feed means, said beater head and said guiding means being the only parts in contact with the inner face of said film loop, a rotating member journalled on said frame about an axis parallel to said first mentioned axis, means for rotating said last mentioned member in synchronism with said drum, means including a plurality of bosses carried by said member and arranged to strike said lever during the rotation of said member, for imparting to said lever a succession of pivoting impulses each capable of stretching said loop by action of said beater member on said loop, and an abutment mounted on said frame to cooperate with said lever to limit to a predetermined value the amplitude of said impulses, said abutment being spaced from the path of travel of said beater head so that the film can move without coming into contact with said abutment.

References Cited in the file of this patent

UNITED STATES PATENTS

| 673,992 | Armat | May 14, 1901 |
|---|---|---|
| 704,449 | Edwards | July 8, 1902 |
| 1,309,471 | Evans | July 8, 1919 |
| 1,406,973 | Carter | Feb. 21, 1922 |
| 1,489,167 | Spiess | Apr. 1, 1924 |
| 1,898,850 | Papo et al. | Feb. 21, 1933 |
| 2,094,162 | Scott | Sept. 28, 1937 |
| 2,103,369 | Howell | Dec. 28, 1937 |
| 2,144,088 | Scott | Jan. 17, 1939 |
| 2,456,702 | Haringx | Dec. 21, 1948 |
| 2,612,075 | Kellogg et al. | Sept. 30, 1952 |

FOREIGN PATENTS

| 538,985 | France | June 17, 1922 |
|---|---|---|
| 222,755 | Great Britain | Oct. 9, 1924 |
| 333,543 | Italy | Jan. 2, 1936 |
| 163,396 | Austria | June 25, 1949 |